Sept. 28, 1965  J. W. JACOBS  3,209,056
METHOD OF INSULATING REFRIGERATOR CABINETS
AND OTHER INSULATION SPACES
Filed Oct. 30, 1962  7 Sheets-Sheet 4

Fig. 5

INVENTOR.
James W. Jacobs
BY
Carl A. Stickel
HIS ATTORNEY

Sept. 28, 1965　　　　　　J. W. JACOBS　　　　　3,209,056
METHOD OF INSULATING REFRIGERATOR CABINETS
AND OTHER INSULATION SPACES
Filed Oct. 30, 1962　　　　　　　　　　　　　7 Sheets-Sheet 5

INVENTOR.
James W. Jacobs
BY
Carl A. Stickel
HIS ATTORNEY

Sept. 28, 1965      J. W. JACOBS      3,209,056
METHOD OF INSULATING REFRIGERATOR CABINETS
AND OTHER INSULATION SPACES
Filed Oct. 30, 1962      7 Sheets-Sheet 6

INVENTOR.
James W. Jacobs
BY
Carl A. Stickel
HIS ATTORNEY

INVENTOR.
James W. Jacobs
BY Carl A. Stickel
HIS ATTORNEY

United States Patent Office 3,209,056
Patented Sept. 28, 1965

3,209,056
METHOD OF INSULATING REFRIGERATOR CABINETS AND OTHER INSULATION SPACES
James W. Jacobs, Dayton, Ohio, assignor to General Motors Corporation, Detroit, Mich., a corporation of Delaware
Filed Oct. 30, 1962, Ser. No. 234,085
5 Claims. (Cl. 264—25)

This invention relates to a method of manufacture and more particularly to a method of insulating refrigerator cabinets and other insulation spaces.

This excellent insulating efficiency, the lightweight and structure reinforcing ability of substantially rigid foam materials has been recognized. However, when these materials are used in high volume production, many molds are required. Further, the cell structure of the foam is not uniform on account of the heat dissipating effect of the walls of the mold and other temperature differences. This lack of uniformity causes the insulation to a more dense and less efficient in insulating effect in some areas. Temperature differences and differences in thermal expansion cause tearing and rupturing of the cells.

It is an object of this invention to provide a method of rapidly insulating an insulating space by treating foam materials in the insulation space so as to more quickly react and produce a uniform cell structure with a lower density and more impervious cell walls.

It is another object of this invention to provide a method of controlling and making more uniform the reaction of foam-forming materials in an insulation space by introducing microwave energy of optimum frequency and power for a sufficient time to accomplish such a result.

It is another object of this invention to provide an improved method of quickly and efficiently introducing microwave energy into the insulation space of a refrigerator cabinet and for varying the frequency and/or power and/or duration of such energy to best control the reaction of foam-forming materials introduced into the space.

It is another object of this invention to control the frequency of the microwave application or to discontinue their application in accordance with changes in the condition of the foam forming materials as they react and foam to form the foam insulation.

These and other objects are attained in the forms shown in the drawings in which a refrigerator cabinet having an outer metal shell and a metal inner liner is placed face down upon a support. For safety, a thin metal mold is placed within the liner and extends around the breaker strip at the throat. Microwave energy is introduced in two different directions at diagonally opposite corners of the back of the cabinet and foam-forming materials are introduced into the insulation space in sufficient amount. These materials are so treated by microwave energy as to provide a quicker and better polymerizing cross-linking reaction and a more uniform foaming action of the materials so as to produce a foam insulation material completely filling the space which has a better cell structure, a more uniform cell structure and a lower average density throughout which is substantially uniform. A similar apparatus is used to insulate a cabinet with a plastic inner liner. For a refrigerator having plastic inner and outer walls, a metal inner mold as well as a metal outer mold which are provided to completely enclose the plastic walls forming the insulation space are preferred for safety, convenience and efficiency. Suitable windows are provided at the diagonally opposite corners of the back of the cabinet for introducing the microwave energy while a central aperture is provide in the back of the mold for introducing the foam-forming materials.

In still another form of apparatus which may be used with a refrigerator cabinet having a plastic inner liner and either a metal or plastic outer shell, the microwave energy is introduced into the interior of the liner so that it radiates directly from a relatively central point into all parts of the insulation space through the chamber enclosed by the plastic liner. Preferably, the microwaves are confined by the metal base in conjunction with either the outer shell or an outer metal mold surrounding the outer shell of the cabinet. The foam-forming materials are likewise introduced through a centrally located aperture in the back of the cabinet or the outer metal mold. The microwave energy speeds and makes more uniform the reaction as well as the cellular foam product forming the insulation. The microwave energy may be provided by a magnetron tube or by a reflex klystron tube preferably having an adjustable provision for varying the frequency of the microwaves. The microwaves may be varied in frequency and otherwise controlled or discontinued by the conditions of the foam-forming material, such as temperature or expansion.

Further objects and advantages of the present invention will be apparent from the following description, reference being had to the accompanying drawings wherein preferred embodiments of the present invention are clearly shown.

Figures 1, 2:
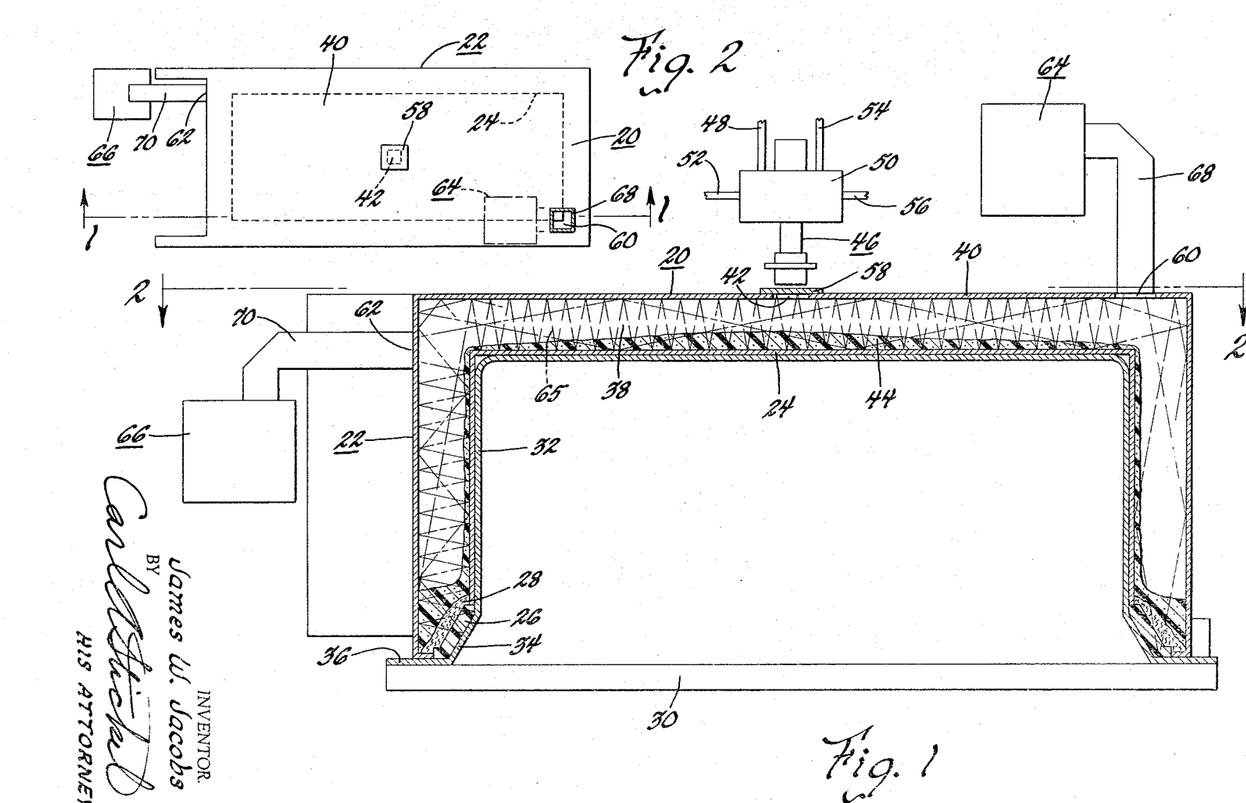
FIGURE 1 is a front vertical sectional view of a refrigerator cabinet, placed face down, taken along the lines 1—1 of FIGURE 2, having metal inner and outer liners together with apparatus for introducing and confining microwaves in the insulation spaces thereof and for introducing foam-foaming materials into the insulation space.
FIGURE 2 is a top sectional view upon a reduced scale taken along the lines 2—2 of FIGURE 1.

Referring now more particularly to FIGURES 1 and 2, there is shown a refrigerator cabinet 20 provided with an outer shell 22 preferably of sheet steel, an inner metal liner 24 likewise of sheet steel and a plastic breaker strip 26 extending completely around the door opening connecting the inner liner 24 and outer shell 22. To provide a space for refrigerant conduits and electrical wiring beneath the breaker strip 26, there is provided a strip 28 of glass fiber or mineral wool extending completely around the door opening of the cabinet beneath the breaker strip 26. The cabinet 20 is placed with its open side face down upon a supporting platform 30 which preferably is provided with a heavy sheet steel box-shaped mold 32 which fits within and supports the metal liner 24. The mold 32 also has a portion 34 extendbing over the plastic breaker strip and outwardly extending flanges 36 resting upon the platform 30. These flanges 36 extend into contact with the outer metal shell 20 so that the insulation space 38 provided between the inner liner 24 and the outer shell 22 is substantially completely enclosed by metal walls.

The back wall 40 of the cabinet 20 is provided with a central filler opening 42 through which the foam-forming material 44 is discharged into the insulation space so that it initially covers the back wall of the inner liner 24 and runs down the sides thereof over the glass fiber strip 28 as shown in FIGURE 1. The foam-forming material issues from a mixer 46. The foam is ordinarily composed of an "A" component which is circulated through the conduit 48 and the valve chamber 50 and, when not discharged into the cabinet, is returned through a return conduit 52 to the recirculating system. A "B" component is circulated through the conduit 54 to the valve chamber 50 and, when not required, it is returned through a separate return conduit 56. When desired, both A and B components are delivered concurrently in proper proportions from the valve chamber 50 to the outlet of the mixer 46. When sufficient foam-forming insulating material is inserted into the insulation space 38, the delivery of the foam-forming materials is stopped and the foam mixer 46 is moved to another cabinet. The opening 42 is closed quickly by a metal plate 58.

One of the difficulties encountered wth the casting of the foam insulation material in the insulation spaces was that the reaction took a considerable period of time and curing was required, both of which required the use of a mold until completed. In high volume production, therefore, many of these molds were required. Some of these molds were relatively expensive thereby incurring a relatively high initial cost to achieve volume production. There is also a lack of uniformity in the insulation. Some portions of the insulation foam would have a relatively low density and other portions would be provided with a relatively high density. Also, the size of the cells were not uniform throughout the mass of insulation. Where the reaction was either endothermic or exothermic, different temperatures were attained causing different speeds of reaction which not only caused a lack of uniformity in density and cell size but also produced undesirable skin effects as well as tearing of the insulation and rupturing of the cells and voids in certain locations. This all reduced the quality and effectiveness of the insulation material.

According to my invention, throughout the casting of the foam material in the insulation space, microwave energy is simultaneously introduced. This speeds and makes more uniform the reaction and also insures the attainment of substantially uniform temperatures, thereby producing a more impervious foam with more uniform density and cell size and a more uniform filling of the insulation cavity. As shown in FIGURES 1 and 2, the outer shell 40 is provided with diagonally opposite openings 60 and 62. Two separate microwave generators 64 and 66 are provided which are connected respectively through the wave guides 68 and 70 to direct the microwave energy through the apertures 60 and 62 into the insulation space 38 in such a manner that the microwave energy penetrates the insulation space substantially and uniformly during the introduction of the foam-forming materials 44 and also during their expansion within the insulation space to form the foam. The microwave energy may be applied until the foam is substantially completely cured. The paths 65 of the microwave energy are indicated by light dot and dash lines in the insulation space. The sheet metal enclosure of the insulation space 38 is highly desirable although theoretically not absolutely essential for the protection of personnel and the efficiency, concentration and uniform application of the microwave energy to the insulation space 38. The mold 32 also prevents the pressure of the foam-forming material 44 from distorting the metal inner liner 24.

Figure 3:
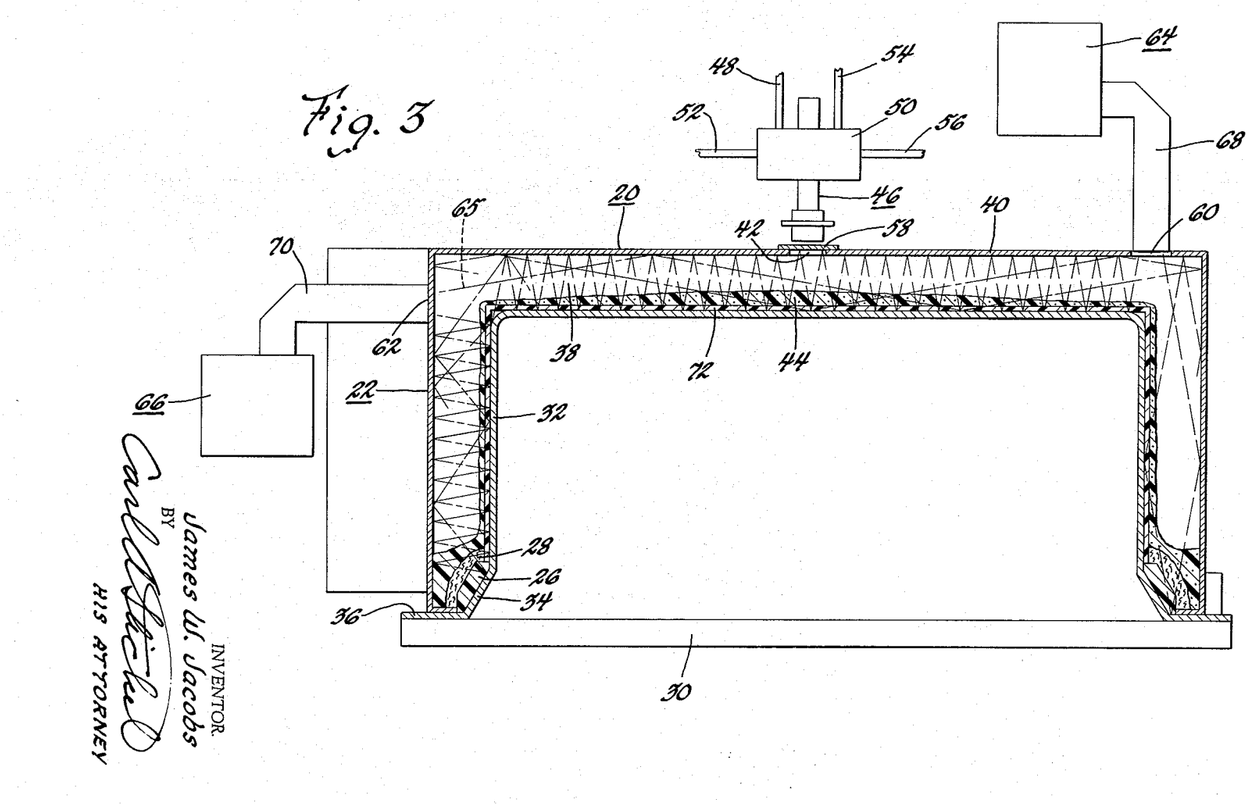
FIGURE 3 is a front vertical sectional view of a refrigerator cabinet, placed face down, having a metal shell and plastic liner together with apparatus similar to that shown in FIGURE 1.

In FIGURE 3, the microwave introducing apparatus as well as the foam mixing apparatus and all parts of the cabinet excepting the inner liner are the same as shown in FIGURE 1. The mold and platform arrangement is also substantially the same. All of these parts bear the same reference characters as found in FIGURE 1. However, in this FIGURE 3, the inner liner 72 is of plastic resin, such as high impact polystyrene. Such a liner can be easily penetrated by the microwave energy. However, the microwave energy is stopped and reflected by the sheet steel mold 32 within the inner liner 72 so that the insulation space 38 is completely enclosed by metal excepting for the small opening through which the foam mixture is introduced.

Figure 4:
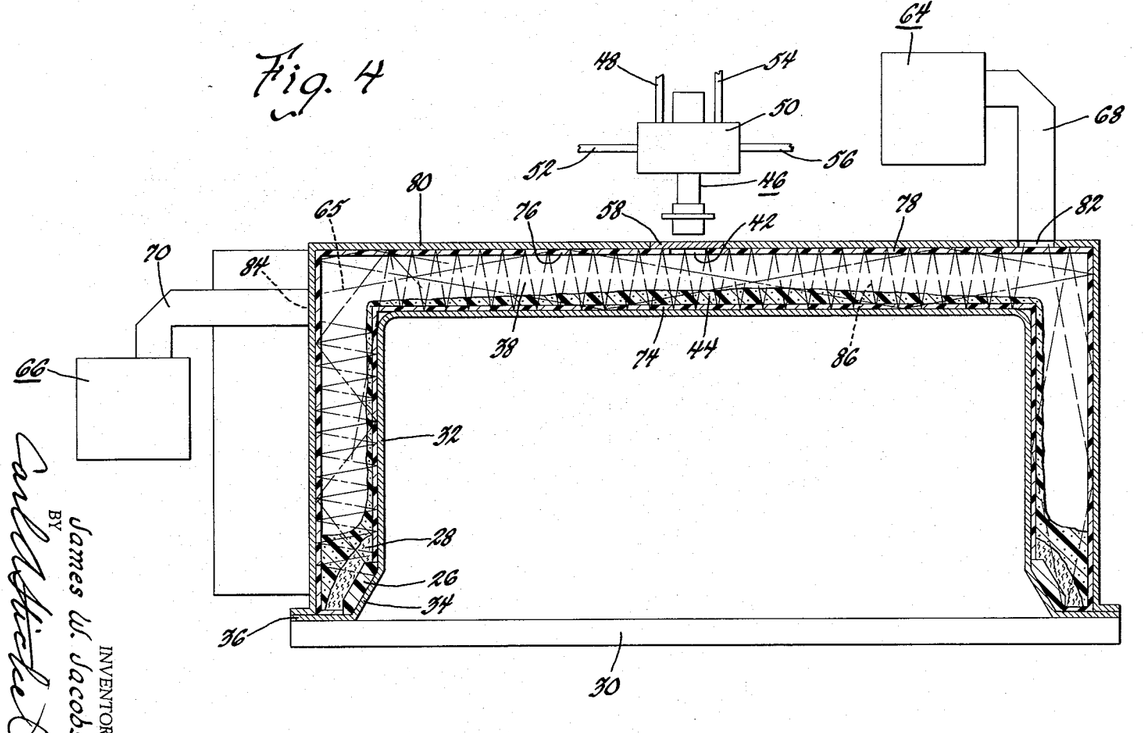
FIGURE 4 is a front vertical sectional view of a refrigerator, placed face down, having plastic inner and outer walls enclosing the insulation space with metal molds on the inside and outside of the insulation space together with microwave apparatus and foam-mixing apparatus for introducing microwave energy and foam-forming material into the insulation space similarly to FIGURE 1.

In FIGURE 4, the inner liner 74 of plastic resin and the outer shell 76, also of plastic resin such as high impact polystyrene, form the inner and outer walls of the insulation space 38 of plastic resin refrigerator cabinet 78. The microwave apparatus and the foam mixing apparatus are the same as in FIGURES 1 and 3 and bear the same reference characters. The platform 30 and the inner mold 32 are likewise the same as in FIGURES 1 and 3. The outer shell 76 is also surrounded by a sheet steel mold 80 having openings 82 and 84 therein arranged similar to the microwave openings 60 and 62 in FIGURES 1 and 2. The wave guides 68 and 70 connect with these openings 82 and 84 to deliver the microwave energy to the insulation space 38 during the introduction of the foam-forming materials from the mixer 46 as well as during the expansion and curing thereof. The microwave energy readily penetrates the inner liner 74 as well as the outer shell 76 since they are both of plastic resin but is stopped and confined by the inner mold 32 and the outer metal mold 80 which reflects the microwave energy so that it distributes itself as suggested by the dot-and-dash lines 86. The sheet metal molds 32 and 80 prevent the escape of microwave energy and thereby protect personnel, improve the concentration and efficiency of their application. Through this arrangement as in FIGURES 1 to 3, a faster and more uniform reaction of the foam-forming materials is attained to provide a lower density foam and more uniform cell size and more uniform density with higher insulating value. The molds 32 and 80 also prevent the pressure of the foam-forming materials 44 from distorting the inner liner 74 and the outer shell 76.

Figure 5:
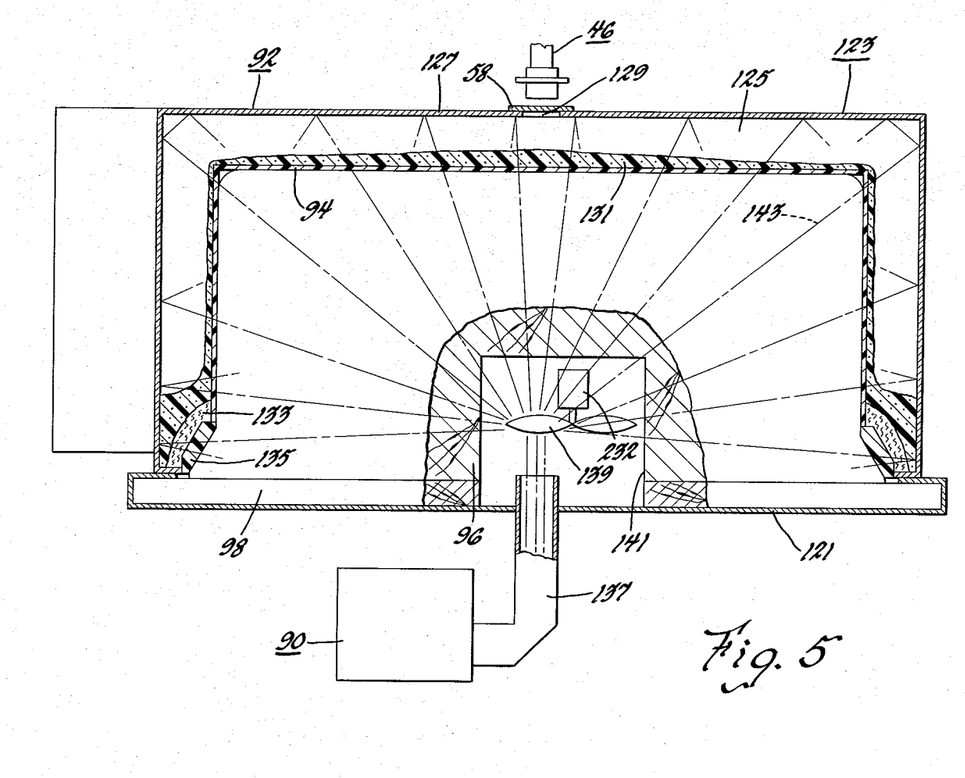
FIGURE 5 is a front vertical sectional view through a refrigerator cabinet, placed face down, provided with a plastic liner and outer metal shell with centrally located microwave apparatus arranged to introduce the microwaves into the chamber enclosed by the plastic liner.

In FIGURE 5, there is provided a modified form of the invention in which a refrigerator having a plastic inner liner has microwave energy applied substantially uniformly from a single microwave generator 90. The refrigerator cabinet 92 includes a plastic resin inner liner 94 fitting over a wood mold block 96 resting on a platform 98 which is provided with a sheet steel covering 121 extending throughout its surfaces as well as around the edges thereof. The outer sheet metal wall 123 completely surrounds the insulation space 125 and meets the edge portions of the sheet metal covering 121 to provide a substantially complete metal enclosure for the insulation space 125 of the refrigerator. The back wall 127 of the cabinet is provided with a substantially centrally located filler opening 129 through which the foam-forming mixture is introduced from the mixer 46 which deposits the foam-forming materials 131 upon the inner surface of the inner liner 94 within the insulation space 125 as shown in FIGURE 5. If desired, Fiberglas material or glass wool 133 may be provided beneath the plastic breaker strip 135. During the introduction of the foam-forming materials 131 as well as during their expansion and curing, the microwave generator 90 through the wave guide 137 discharges the microwave energy from a substantially central point onto the stirrer 139 located within the cavity 141 in the wood mold block 96. The stirrer 139 is rotated by a motor 232 distributes the microwave energy as indicated by the dot-and-dash lines 143 throughout the enclosure bonded by the outer metal shell 123 of the cabinet and the metal enclosure 121 of the platform 30. The microwave energy speeds the reactions within the foam-forming materials and makes them more uniform so that a superior more uniform product of lower average density and greater uniformity and density and cell size and cellular structure is thereby obtained.

As one specific example of the foam-forming material suitable for introduction into the insulation space 38 accompanied by a treatment by microwave energy, for the A component, one hundred parts by weight of a prepolymer made from seventy-nine parts by weight of a poly diisocyanate mixture comprising eighty parts by weight of 2,4 toluene diisocyanate and twenty parts by weight of 2,6 toluene diisocyanate together with twenty-one parts by weight of a polyether A as defined hereinafter is continuously circulated through the conduit 48, the mixer 50 and the return conduit 52. The B component circulates independently through the mixer 50 from the conduit 54 to the conduit 56. The B component is composed of eighty-seven parts by weight of the same polyether A as defined hereinafter to three parts by weight of an activator consisting of two parts by weight of tetramethylbutanediamine and one part by weight of organo-silicon surfactant and thirty-eight parts by weight of trichloromonofluoromethane. Polyether A as mentioned above is made up of:

| | |
|---|---|
| Sucrose | 1 |
| Propylene oxide | 11 |
| Ethylene oxide | 4 |
| OH No. | 445–470 |
| $H_2O$ max. (by weight) __________percent__ | .15 |
| Viscosity (cps.) at 25° C. | 22000–32000 |
| Ph | 3.5–5 |

(All quantities express in mols unless otherwise noted)

These materials through suitable dual valving arrangements in the valve chamber are separately introduced into the mixing chamber of the mixer 46 in the proportion of one hundred parts by weight of the A or prepolymer component to one hundred and twenty-eight parts by weight of the B or polyether component. This mixture is discharged into the insulation space 38 through the centrally located opening 42 in the rear wall thereof. The microwave energy from the microwave generators 64, 66 and 90, for example, may introduce microwaves at 2453 megacycles frequency. This and some other foam forming materials which can be used are defined in the application S.N. 234,084, filed concurrently with this application and having the same inventor. It is to be understood that the principles set forth in this application may be used in the production of all types of polyurethane materials whether solid, cellular, flexible or rigid. For example, foams such as are described in copending application Serial No. 809,702 assigned to the assignee here, may be produced and controlled through the use of the present method. In the foregoing application, rigid foams having the cells substantially filled with a retained halogen, substituted hydrocarbon are disclosed which foams are highly useful for insulating materials and the like. On the other hand, if $CO_2$ blown foams are desired either rigid or flexible, the hydrocarbons may be eliminated and formulations of the general type disclosed in the aforementioned application may be used with the addition of small quantities of water to initiate the formation of the $CO_2$ during the reaction. In all cases, however, due to the specific function of the microwave energy, the use of the catalyst may be reduced and in some cases completely eliminated if proper controls are provided.

These deviations are possible due to the extremely uniform distribution of microwave energy throughout the reaction mass whereby molecules of the reactants are activated by the field so that uniform heating is obtained whereby the entire mass reacts simultaneously and uniformly. This makes possible more uniform temperatures during the reaction than are normally possible during the usual reaction where high temperatures are involved in portions of the reacting mass and are isolated by the remainder of the materials in the mass due to its low heat conductivity so that various portions of the mass become fully reacted while other portions of the mass, which are in contact with the atmosphere, may not react completely during the same time period. These variations within the reacting mass are the cause for the nonuniform cell size, heavy crusts on external surfaces of the mass and other undesirable conditions which have always created difficulties in the production of materials of this character. By absorbing uniform energy in the form of heat throughout the entire reacting mass simultaneously, I have found that it is possible to produce a more uniform material wherein a more complete reaction is accomplished throughout the reaction mass.

These statements are proven by the fact that two reaction mixtures having identical materials therein and in identical quantities were reacted with greatly dissimilar results. In the material subjected to microwave energy, the density was lower resulting in a greater volume of foam, and the cell distribution was more uniform than in the material made through normal procedures with the catalyst as a means for initiating and progressing the reaction.

In all instances, due to the uniformity of reatcion throughout the mass and the uniformity of temperatures involved, shear effect is reduced and in most instances eliminated entirely, whereby one of the major problems in the casting of foams is overcome. Also, bread-loafing of material formed in open molds is drastically reduced due to the uniformity of the reaction whereby waste or scrap material is substantially eliminated.

In any of the formulas to follow, variations well known within the art may be made. In other words, the quantities of reactants may vary in accordance with their acid number and/or hydroxyl number wherein stoichiometric quantities may be used to produce satisfactory polyurethane materials. The chemical formulations of these materials form no part of this invention which is specifically directed to the method of activating the ingredients to produce a controlled reaction through the use of microwave energy.

Various polyesters, polyethers and polyesteramides, etc., may be used for the production of polyurethanes. Polyesters and polyesteramides may be obtained by condensing a variety of polybasic acids, preferably dibasic acids such as adipic, sebacic, phthalic, oxalic, malonic, succinic, maleic, fumaric, itaconic, etc., with polyalcohols such as ethylene glycol, diethylene glycol, glycerol, sorbitol and/or alcohols such as ethanolamine and aminopropanol, etc. Alkylene glycols and polyoxyalkylene glycols which may be used include ethylene glycol, propylene glycol, styrene glycol, diethylene glycol, polyethylene glycol, and polypropylene glycol and copolymers of these glycols, etc. Polyethers may be formed by reacting polypropylene oxide, or ethylene oxide, for example, with sorbitol, trimethylolpropane, pentaerythritol, sucrose, methyl glucoside, phenol, etc.

Suitable organic polyisocyanates for use in the reaction include aromatic diisocyanates such as toluene 2,4 diisocyanate, toluene 2,6 diisocyanate and mixtures thereof, ethylene diisocyanate, propylene-1,2-diisocyanate, butylene-1,3-diisocyanate, hexylene-1,6-diisocyanate, triphenylmethane diisocyanate, 1,5 polyphenol methane isocyanate.

Other additional foam-forming materials not mentioned in S.N. 234,084 may be introduced into the insulation spaces 38 or 125 and similarly treated with microwave energy. Examples of such other foam-forming materials which may advantageously be treated with microwave energy include unsaturated polyester resin provided with a fluoro hydrocarbon, surfactant and catalyst; vinyl foam forming materials such as polyvinyl chloride resin with a blowing agent, stabilizer and plasticizer; epoxy resin foam-forming materials such as are disclosed in U.S. Patent 3,051,661 issued August 28, 1962. Also microwave generators having a different frequency and a different available intensity may also be used for different periods of time to obtain the exact results desired.

Figures 6, 7, 8:
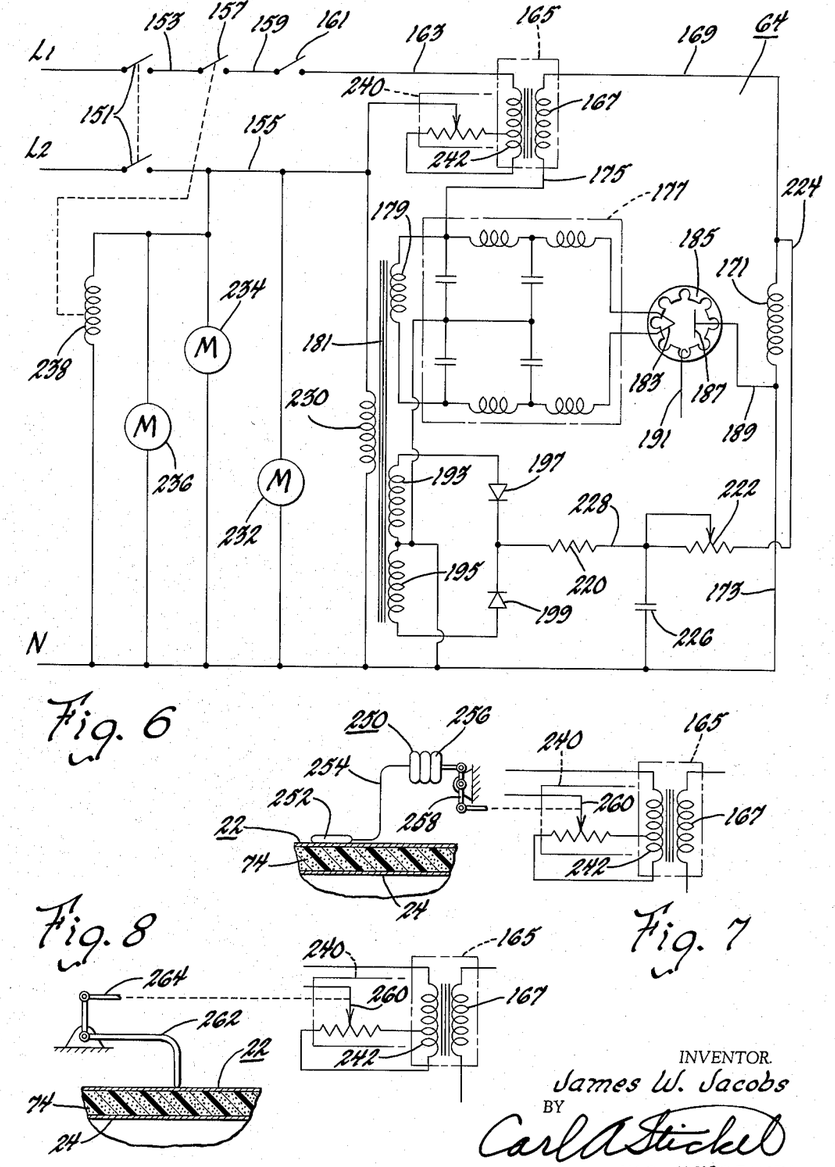
FIGURE 6 is a wiring diagram for the microwave apparatus.
FIGURE 7 is a diagram of a control system arranged to be responsive to the temperature of the back wall of the cabinet as the foam is introduced for controlling the power of the microwave generator.
FIGURE 8 is a diagram of a control system for controlling the power of the microwave generator in response to the expansion of the foam-foming materials in the insulation space.

One specific example of the microwave generator 64 is shown in FIGURE 6. In this figure, the supply conductors $L_1$ and $L_2$ connect to the double pole, ON/OFF switch 151. This controls the supply of energy to the conductors 153 and 155. The conductor 153 connects through a time delay switch 157, a conductor 159 and a foam head switch 161 with the conductor 163 connecting with the high voltage transformer 165. The output coil 167 of the transformer 165 has one terminal connected through the conductor 169 to the magnetron field coil 171 having its second terminal connected by the conductor 173 to the neutral supply conductor N. The second terminal of the output coil 161 is connected by the conductor 175 to the filter network 177. This filter network 177 is powered by a six volt output coil 179 of a transformer 181. The output from the filter network 177 is connected to the filament 183 of the magnetron tube 185 which is provided with an antenna 191 to discharge the microwave energy into the adjacent end of its wave guide 68. The plate 187 of the magnetron tube is connected by the conductor 189 to the conductor 173. The transformer 181 also supplies the full wave rectifying arrangement through the 110 volt output coils 193 and 195 which through oppositely positioned rectifiers 197 and 199 supply current through a fixed resistance 220 and a variable resistance 222 in the form of a field current control connecting through the conductor 224 with the conductor 169 for supplying the energizing current for the magnetic field coil 171. A capacitor 226 connects the conductor 228 joining the resistances 220 and 222 with the conductor 173. The energizing transformer primary coil 230 is connected between the conductor 155 and the neutral conductor N. The motor 232 for the stirrer 139 may also be connected between the conductors 155 and the neutral conductor N. In addition, a fan motor 234 may be provided for driving a cooling fan for the microwave apparatus, such as the apparatus 64, 66 or 90. A third motor 236 may be provided for driving a pump for pumping a liquid coolant for the magnetron assembly. The operating coil 238 of the time delay relay which operates to close the switch 157 after a short time delay, such as five seconds, is also connected between the conductor 155 and the neutral supply conductor N. A power level control 240 is provided for the energizing coil 242 of the transformer 165 for controlling the power level output of the magnetron tube 185.

The microwave generator 64 illustrated in FIGURE 6 may be modified to provide a thermostatic control for the power level control 240. To accomplish this as shown in FIGURE 7, a thermostatic switch 250 including a thermosensitive bulb 252 temporarily mounted upon the outside of the outer shell of the cabinet may be connected through a capillary tube 254 to a fluid motor 256 which through the bell crank lever 258 operates an adjustable tap 260 upon the power level control 240 to reduce the power as the temperature rises. Instead of a temperature control as illustrated in FIGURE 7, there may be a control as illustrated in FIGURE 8, responsive to the expansion of the foam which, in its final form, is designated also by the reference character 74. When the expansion of the foam-forming material 74 begins to move the outer metal shell 22 outwardly, it operates a bell crank lever 262 and a rod 264 which operates the tap 260 on the power level control 240 to reduce the power level as the foam begins to apply pressure to the outer shell 22 to reduce the power level.

Figures 9, 10:
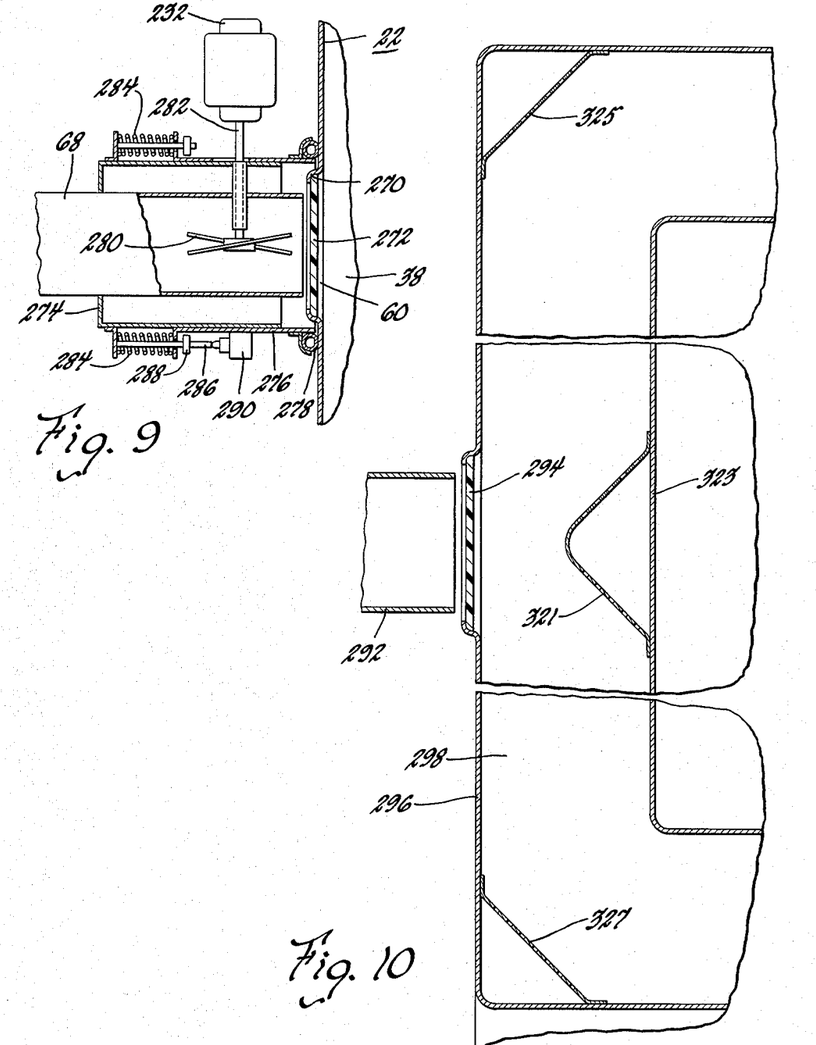
FIGURE 9 is a fragmentary vertical sectional view through an end portion of the wave guide showing a means for insuring a good transmission of wave energy from the wave guide to the insulation space without leakage and for providing a modulating or stirring action which will improve the distribution of the wave energy as it is introduced into the insulation space.
FIGURE 10 is an enlarged sectional view through the back portion of a refrigerator cabinet provided with a metal inner liner and a metal outer shell having means for insuring better distribution of microwave energy throughout the insulation space.

In FIGURE 9, there is shown a detailed arrangement for connecting the wave guides, such as the wave guide 68, to the insulation space 38. As illustrated, the outer metal shell 22 is provided with a flange 270 surrounding the opening 60 which is provided with a plastic window 272 which may be clear or opaque. The window 272 may be made of any sheet plastic which is readily penetrated by the microwaves. The wave guide 68 is surrounded by a flanged sleeve 274 carrying a sliding sleeve 276 which in turn supports a gasket 278 of copper braid which is placed against the outer shell 22 surrounding the window 272. This copper braid provides a seal to prevent the escape of microwaves during their application. In order to properly distribute the microwaves, there is provided within the wave guide 68 a modulator 280 which is mounted upon the end of a rotatable shaft 282 which likewise may be driven by motor 232 indicated in FIGURE 6. This modulator will distribute the waves entering the insulation space 38 in such a manner that substantially all parts of the insulation space will be penetrated by microwaves to substantially an equal extent. The sliding sleeve 276 is pressed toward the outer shell 22 by a set of coil springs 284. One coil spring 284 is provided with a pin 286 having thereon a stop 288 which is adapted to be engaged when the microwave generator 68 is withdrawn from the outer shell 22 to operate to open position a normally closed control switch 290 which may be connected in series with the conductor 163 to deenergize the microwave apparatus. The control switch 290 will start the microwave generator apparatus shown in FIGURE 6 when the foam mixer 46 is applied and stop the microwave apparatus when the foam mixer is removed.

If it is desired to apply the microwave energy from a single wave guide 292 through a window 294 in the back of a metal outer shell 296 into an insulation space 298 as shown in FIGURE 10, the interior of the insulation space 298 may be provided with a cone-shaped reflector 321 mounted directly opposite the window 294 upon the sealed face of the inner liner 323. This will spread the microwave energy laterally within the insulation space 298 in all directions. This reflector 321 is preferably perforated so that it may be filled with the foam-forming material during the filling and expansion of the insulation space. Furthermore, perforated reflectors 325 and 327 may be provided in the corners of the insulation space 298 and fastened to the outer walls 296 also to assist in directing the microwave energy to other areas of the insulation space 298.

Figure 11:
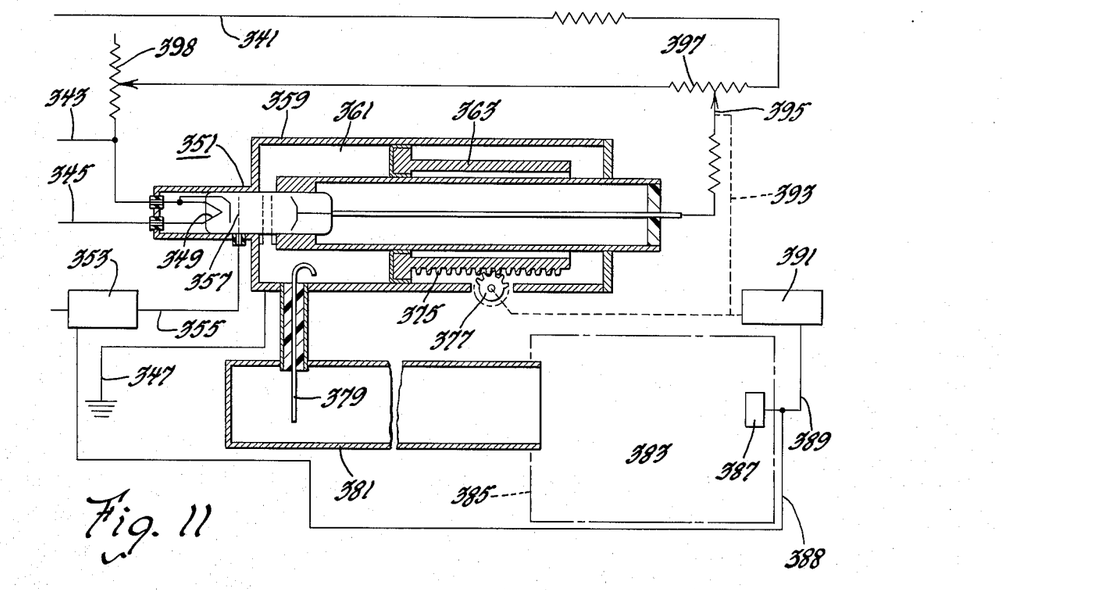
FIGURE 11 is a wiring diagram for an adjustable frequency microwave generator in the form of reflex klystron tube arrangement.

As illustrated in FIGURE 11, an adjustable frequency microwave generator which is adjusted in accordance with either pressure or temperature conditions of the foaming material may be substituted for the microwave apparatus designated by the reference characters 64, 66 and 90 and illustrated in FIGURE 6. This generator in the form of a reflex klystron tube generating system includes a —540 volt D.C. supply conductor 341, a —320 volt D.C. supply conductor 343, a —326 volt D.C. supply conductor 345 and a grounded conductor 347. The filament 349 of the klystron tube 351 is connected across the conductor 343 and 345 so that it is energized at 6 volts. An adjustable modulator 353 supplies voltages in the proximity of —350 volts through the conductor 355 to the control grid 357. The klystron tube 351 is surrounded by a metal cylinder 359 forming a resonant cavity 361 surrounding the tube. The resonant cavity 361 is tuned by the use of a cylindrical piston-type cavity tuner 363 provided with a rack 375 meshing with the cavity pinion 377 which rotataes to move the cavity tuner to vary the tuning of the resonant cavity 261. The cylinder 359 supports but is electrically insulated from the radiating antenna 379 extending from the resonant cavity 361 into the interior of the wave guide 381. The wave guide 381 extends to an insulation space 383 surrounded by metal walls 385 indicated by a dot-and-dash outline. The system is provided with a control including a thermal or pressure sensor 387 responsive to the temperature or pressure of the foaming materials within the space 383 and operating through an operating connection 389 to control a fluid motor or other type of motor 391 which rotates the pinion 377 which through the rack 375 positions the tuner 363 to vary the tuning of the resonant cavity 361 in accordance with the conditions of the foaming material 383. At the same time, the motor 391 through the operative connection 393 operates the movable tap 395 of the oscillation sustaining rheostat 397. The thermal or pressure sensor 387 through the connection 388 is operatively connected to adjust the modulator 353 for modulating the power output of the klystron tube 351 as the resonant cavity 361 is tuned. The variable resistance 398 connects the variable resistance 397 with the supply conductor 343 for initially calibrating the circuit.

Figure 12:
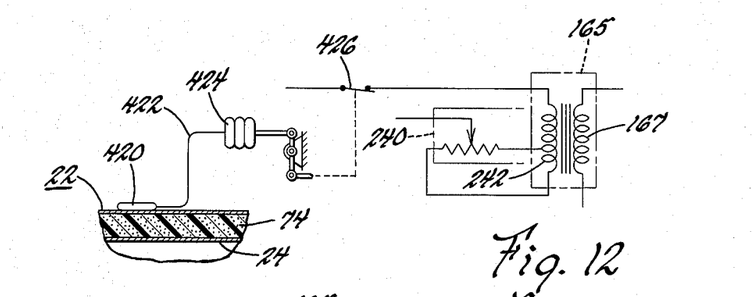
FIGURE 12 is a diagram of a control system responsive to the temperature of the back wall of the cabinet as the foam is introduced and expands for discontinuing the application of the microwave energy.

In FIGURE 12, there is shown a thermostatic switch which includes a thermosensitive bulb 420 connected to a capillary tube 422 with a fluid motor 424 which operates a normally closed switch 426 connected in series with the conductor 163 to deenergize the supply circuit of the microwave energy when the foam-forming material reaches a predetermined high temperature. To do this, the thermosensitive element 420 is placed in contact with the outside of the rear wall 22. In this way, the reaction of the foam-forming materials can be used to terminate the application of the microwave energy to the foam-forming materials in the insulation space.

Figure 13:
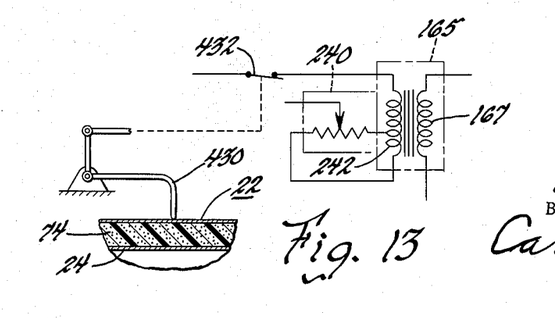
FIGURE 13 is a diagram of a control system responsive to the expansion of the foam-forming materials for discontinuing the application of microwave energy.

In FIGURE 13, a follower 430 is provided in contact with the outer metal shell 22 of the cabinet which is to be insulated. This follower 430 through a snap action switch mechanism 432 which may be connected in series with the conductor 163 operates to deenergize the microwave generator when the outer metal shell 22 of the cabinet begins to expand. Though this arrangement, when the foam-forming material begins to expand or distend the wall surfaces, the microwave generator is deenergized. This substantially stops the reaction of the foam-forming materials so that excessive pressures will not be built up in the insulation space to expand or bow outwardly the walls of the cabinet.

My microwave energy, I mean electromagnetic wave energy of about $10^7$ to $10^{13}$ cycles.

While the embodiments of the present invention as herein disclosed constitute preferred forms, it is to be understood that other forms might be adopted.

What is claimed is as follows:

1. The process of filling an enclosed space with foam material which includes inserting into said space substantially unreacted mobile fluid foam-forming resin material, and while said foam forming resin material is in the substantially unreacted mobile fluid state beginning the introduction of electromagnetic wave energy between about $10^7$ to $10^{13}$ cycles into said space and continuing the introduction of the wave energy into said space during the reaction of said foam forming resin material to form a foam resin material in said space.

2. The process of filling an enclosed space with foam material which includes inserting into said space substantially unreacted mobile fluid foam forming resin material, and while said foam forming resin material is in the substantially unreacted mobile fluid state beginning the introduction of electromagnetic wave energy between about $10^7$ to $10^{13}$ cycles into said space and continuing the introduction of the wave energy into said space during the reaction of said foam forming resin material until the foam forming resin material reaches a predetermined high temperature.

3. The process of filling an enclosed space with foam material which includes inserting into said space substantially unreacted mobile fluid foam forming resin material, and while said foam forming resin material is in the substantially unreacted mobile fluid state beginning the introduction of electromagnetic wave energy between about $10^7$ to $10^{13}$ cycles into said space and continuing the introduction of the wave energy into said space during the reaction of said foam forming resin material until the foam forming resin material expands to substantially fill said space.

4. The process of filling an enclosed space with polyurethane foam material which includes inserting into said space substantially unreacted mobile fluid foam forming resin material containing a diisocyanate and a volatile liquid, and while said foam forming resin material is in the substantially unreacted mobile fluid state beginning the introduction of electromagnetic wave energy of between about $10^7$ to $10^{13}$ cycles into said space and continuing the introduction of the wave energy during the reaction of the foam forming resin material containing the diisocyanate to assist in the reaction and to assist in the volatilization of said volatile liquid.

5. The process of filling connected enclosed hollow wall spaces between the outer and inner walls of a cabinet with foam material which includes inserting into said connected enclosed space substantially unreacted mobile fluid foam forming resin material, and while said foam forming resin is in the substantially unreacted mobile fluid state projecting electromagnetic wave energy of between about $10^7$ to $10^{13}$ cycles parallel to one of the walls into said connected enclosed space to assist in the reaction of the foam forming resin material.

References Cited by the Examiner

UNITED STATES PATENTS

| | | | |
|---|---|---|---|
| 2,549,864 | 4/51 | Toulmin. | |
| 2,603,741 | 7/52 | Seifried et al. | 219—10.55 XR |
| 2,608,637 | 8/52 | Dakin et al. | 219—10.55 |
| 2,716,694 | 8/55 | Schroeder | 219—10.55 |
| 2,738,406 | 3/56 | Zaleski | 219—10.55 |
| 2,764,516 | 9/56 | Pace | 18—59 XR |
| 2,841,205 | 7/58 | Bird | 18 |
| 2,948,665 | 8/60 | Rubens et al. | 18 |
| 2,993,973 | 7/61 | Johnson et al. | 219—10.55 |
| 3,028,472 | 4/62 | Baird | 219—10.55 XR |

FOREIGN PATENTS 864,965   4/61   Great Britain.

OTHER REFERENCES

Modern Plastics, "Urethane Foam Brings Back the Gas Refrigerator," vol. 38, No. 8, April 1961, pages 96–98.

ALEXANDER H. BRODMERKEL, *Primary Examiner.*